(12) United States Patent
Edmunds

(10) Patent No.: US 9,759,989 B1
(45) Date of Patent: Sep. 12, 2017

(54) CAMERA CAMOUFLAGE DEVICE

(71) Applicant: David Edmunds, Palmyra, MO (US)

(72) Inventor: David Edmunds, Palmyra, MO (US)

( * ) Notice: Subject to any disclaimer, the term of this patent is extended or adjusted under 35 U.S.C. 154(b) by 0 days.

(21) Appl. No.: 15/137,538

(22) Filed: Apr. 25, 2016

Related U.S. Application Data

(60) Provisional application No. 62/153,450, filed on Apr. 24, 2015.

(51) Int. Cl.
*G03B 17/56* (2006.01)
*A01M 31/00* (2006.01)
*H04N 5/33* (2006.01)

(52) U.S. Cl.
CPC ......... *G03B 17/561* (2013.01); *A01M 31/002* (2013.01); *H04N 5/33* (2013.01)

(58) Field of Classification Search
None
See application file for complete search history.

(56) References Cited

U.S. PATENT DOCUMENTS

| | | |
|---|---|---|
| 2,992,503 A | 7/1961 | Webb |
| 5,677,017 A | 10/1997 | Freeman |
| 6,033,608 A | 3/2000 | Reynolds |
| 6,449,431 B1 | 9/2002 | Cuddeback |
| 7,534,056 B2 | 5/2009 | Cross |
| 7,975,973 B1 | 7/2011 | Weeden |
| 8,109,680 B2 | 2/2012 | Olien |
| 8,810,718 B1 * | 8/2014 | Cuddeback .......... H04N 5/2256 348/370 |
| 2005/0053732 A1 | 3/2005 | Tilby |
| 2009/0010637 A1 | 1/2009 | DeWitt |
| 2012/0288267 A1 | 11/2012 | Cuddeback |
| 2013/0188047 A1 | 7/2013 | Slevin |
| 2014/0305375 A1 | 10/2014 | Rogillio |
| 2014/0308475 A1 | 10/2014 | O'Connor |

* cited by examiner

*Primary Examiner* — Rochelle-Ann J Blackman
(74) *Attorney, Agent, or Firm* — CreatiVenture Law; Linda L. Lewis; Dennis Donahue

(57) ABSTRACT

This invention is a tree-mountable camera camouflage device having a knothole, wherein the knothole has a front side, a back side and an opening therethrough; wherein the front side has a camouflage surface and a front opening; wherein the back side has a camera compartment that fluidly connects with the opening; wherein the camera compartment is configured to removeably mount a camera; and wherein when the camera, and the knothole are removeably assembled, and mounted on a tree, the camera is concealed.

16 Claims, 31 Drawing Sheets

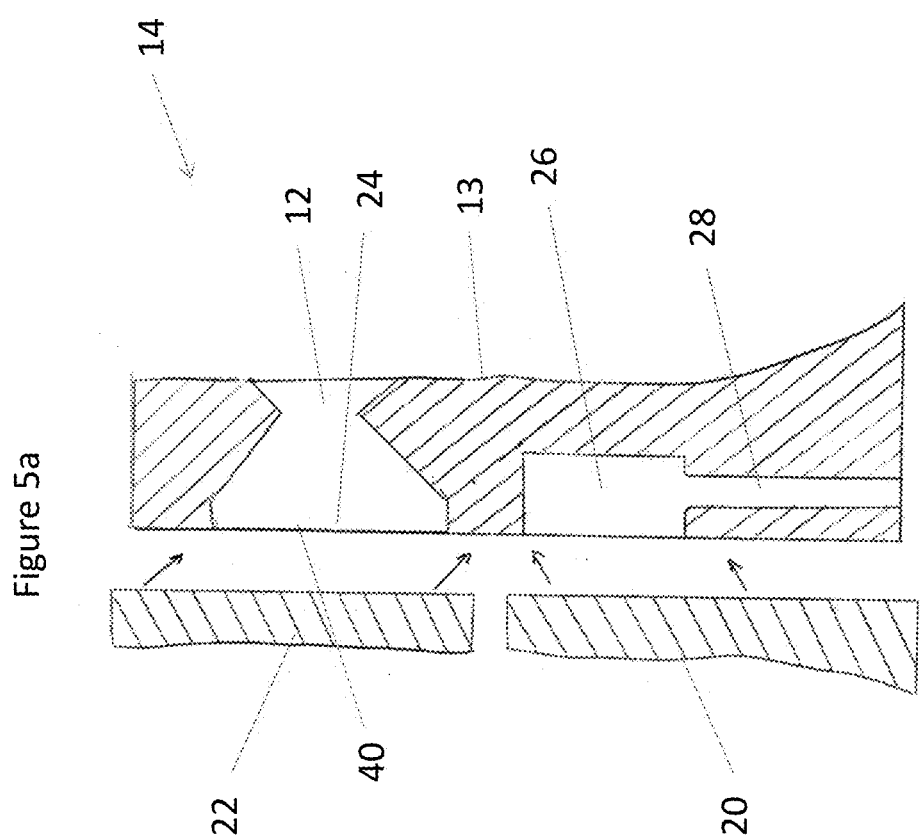

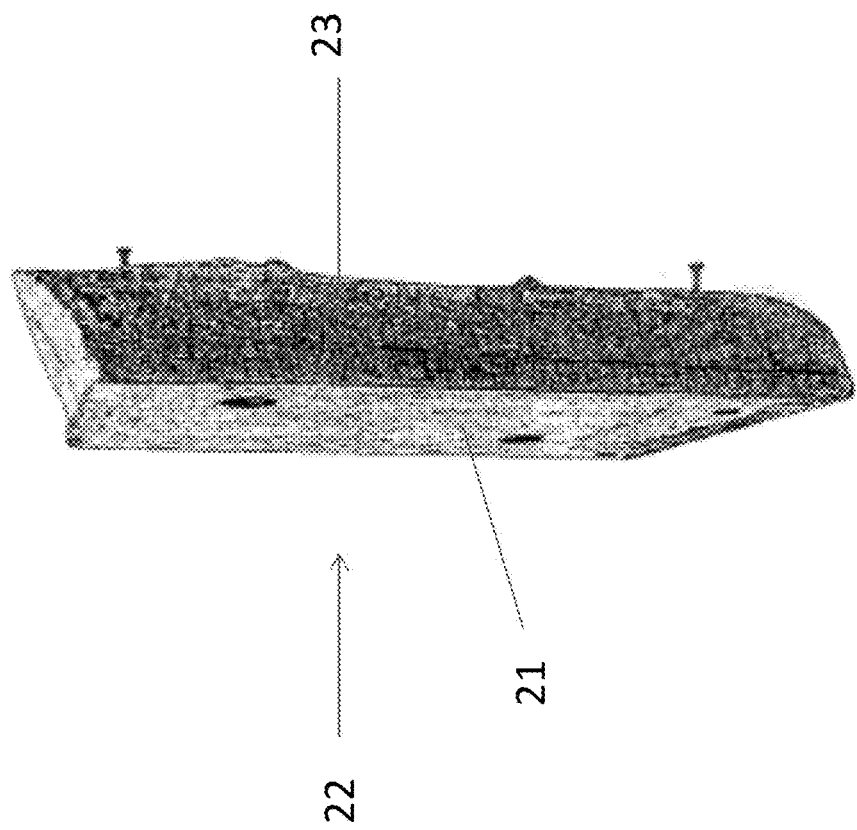

CAMERA CAMOUFLAGE DEVICE

CROSS-REFERENCE TO RELATED APPLICATIONS

This application claims the benefit of Provisional Patent Application Ser. No. 62/153,450 filed Apr. 27, 2015.

STATEMENT REGARDING FEDERALLY SPONSORED RESEARCH

Not Applicable.

APPENDIX

Not Applicable.

BACKGROUND OF THE INVENTION

Field of the Invention

The present invention relates to trail cameras, and more particularly to camouflaged trail cameras that are disguised and secured against theft.

Related Art

Cameras for scouting potential hunting areas and determining game patterns are known in the art. The camera can include a passive infrared sensor (e.g., a motion/heat sensor) that is adapted to sense movement and activate the camera. The camera can include a delay timer with multiple settings to eliminate multiple exposures, and include high/low sensitivity settings to allow adjustment of the effective range.

Such cameras can be mounted in an enclosure that can be attached to a tree. Because the camera must be accessed for adjustment or removal, the enclosure is designed for ready entry. The enclosure is typically camouflaged. Because the camera may be left in the woods for extended periods of time, the camouflage not only hides the unit from unsuspecting game, but also helps to prevent theft. Nevertheless, even if camouflaged, security is a concern, so most units include a locking mechanism. However, even if the unit is locked, the entire unit can be removed and stolen.

Prior art devices have been used for camouflaged trail cameras. Most prior art devices fail to disguise the camera so that it cannot be discovered and stolen. The present invention so thoroughly disguises the camera that it cannot be discovered, and if it is discovered, cannot be easily removed. None of the prior art devices below do what the present invention does.

Examples of known prior art devices are described U.S. Pat. No. 6,449,431, U.S. Pat. No. 7,534,056, U.S. Pat. No. 7,975,973, U.S. 2005/0053732, U.S. 2009/0010637, U.S. 2012/0288267, U.S. 2013/0188047 and U.S. 2014/0308475. None of the above references disclose the claimed invention.

SUMMARY OF THE INVENTION

A first embodiment of this invention is a free-standing camera camouflage device having a front cover and a back cover, wherein the front cover has a front side and a back side; wherein the front side has a camouflage surface and a front opening; wherein the back side has a camera compartment that fluidly connects with the opening; wherein the back cover has an inner side and an outer side; wherein the inner side removeably attaches to the back side of the front cover to cover the camera compartment; where the outer side has a camouflage surface that is consistent with the front side camouflage; wherein the camera compartment is configured to removeably mount a camera; and wherein when the camera, the front cover and the back cover are removeably assembled, the camera is concealed.

A second embodiment of this invention is a tree-mountable camera camouflage device having a knothole, wherein the knothole has a front side, a back side and an opening therethrough; wherein the front side has a camouflage surface and a front opening; wherein the back side has a camera compartment that fluidly connects with the opening; wherein the camera compartment is configured to removeably mount a camera; and wherein when the camera, and the knothole are removeably assembled, and the back side is mounted on a tree, the camera is concealed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5a is a side cut-away diagram of the front cover of the device, the back bottom cover and the back top cover, disassembled.

FIG. 6 is a raised side perspective of the back top cover.

DETAILED DESCRIPTION OF THE PREFERRED EMBODIMENTS

The following description of the preferred embodiment(s) is merely exemplary in nature and is in no way intended to limit the invention, its application, or uses.

Figure 1:
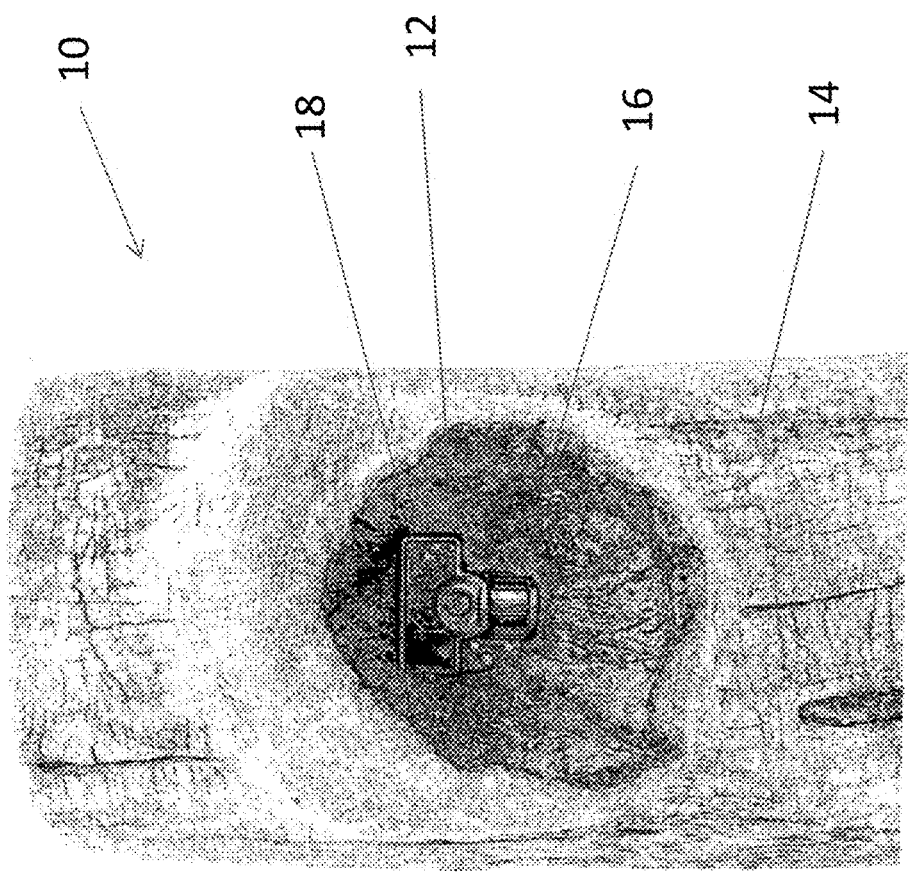
FIG. 1 is a partial front perspective of the camera camouflage device.
Figure 2:
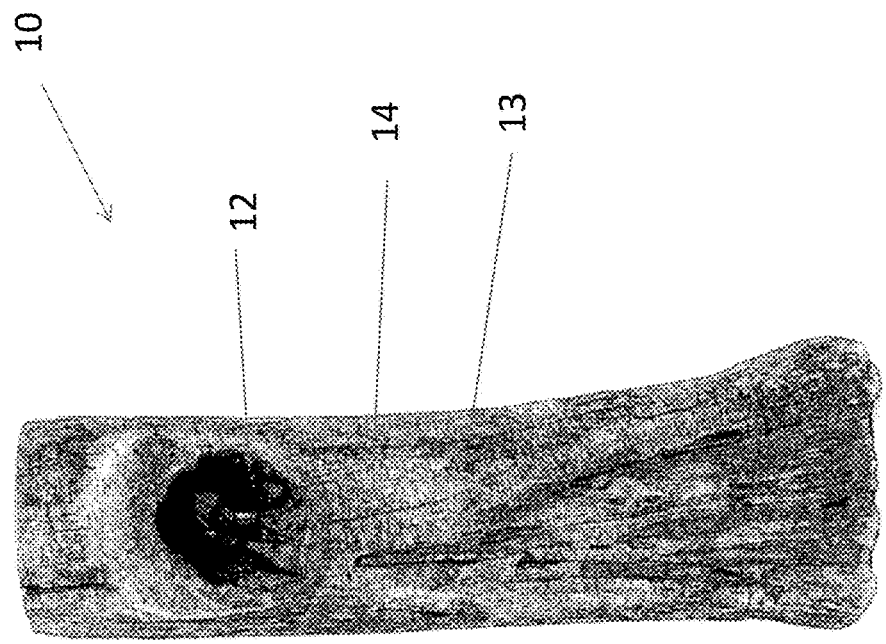
FIG. 2 is a full front perspective of the camera camouflage device.
Figure 3:
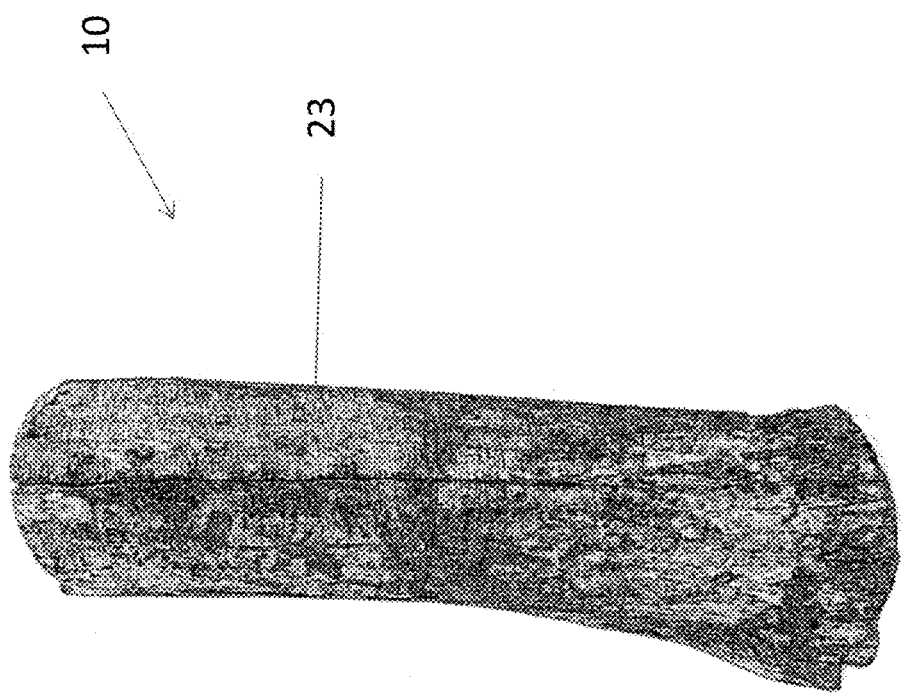
FIG. 3 is a full back perspective of the camera camouflage device.
Figure 4:
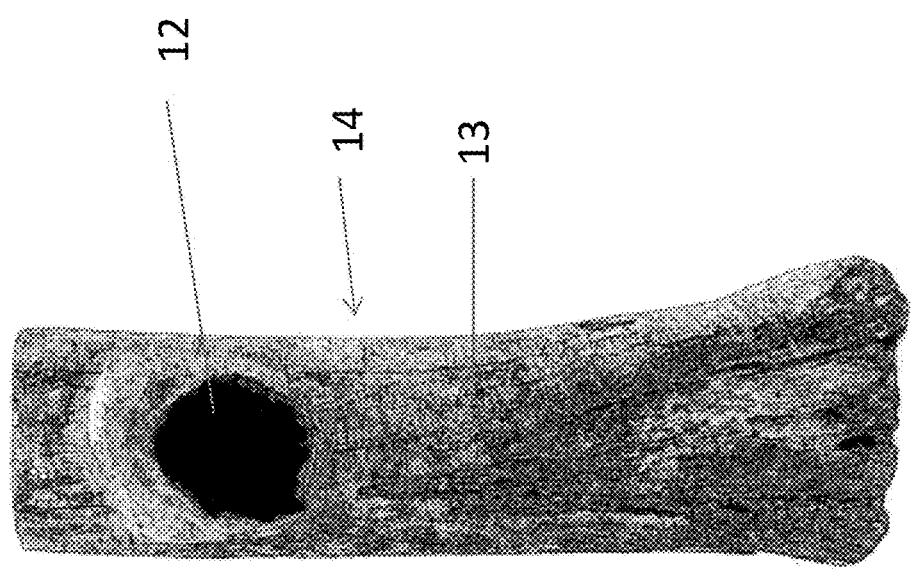
FIG. 4 is a full front perspective of the front cover of the device, with no insert or camera.
Figure 5:
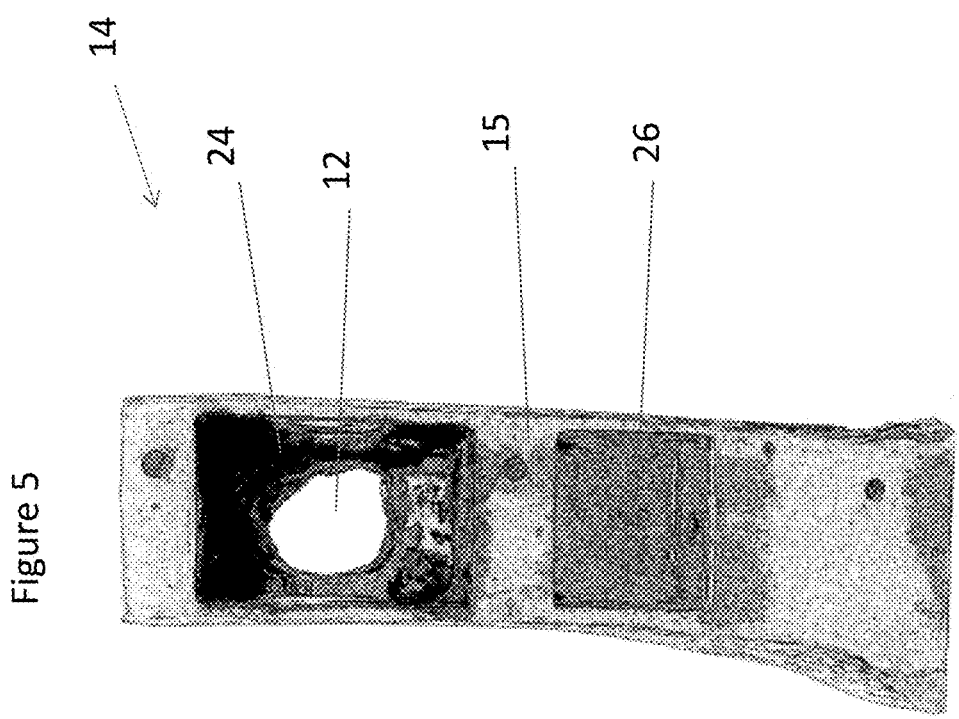
FIG. 5 is a full back perspective of the front cover of the device, with no insert or camera.

The first embodiment of the present invention is a free-standing tree stump camera camouflage device 10, as shown in FIGS. 1-15. The device 10 has a front cover 14 and a back covers 20 and 22. As shown in FIGS. 1, 2 and 5, the front cover 14 has a front side 13, a back side 15 and an opening 12 therethrough. The front side 13 has a camouflage surface 11 and a front opening 9 that fluidly connects with the opening 12. The back side 15 has a camera compartment 24 that fluidly connects with the opening 12, a camera compartment back opening 40 that fluidly connects with the camera compartment, and a locking compartment 26. In a preferred embodiment, the camera compartment and the locking compartment are one compartment.

Figure 7:
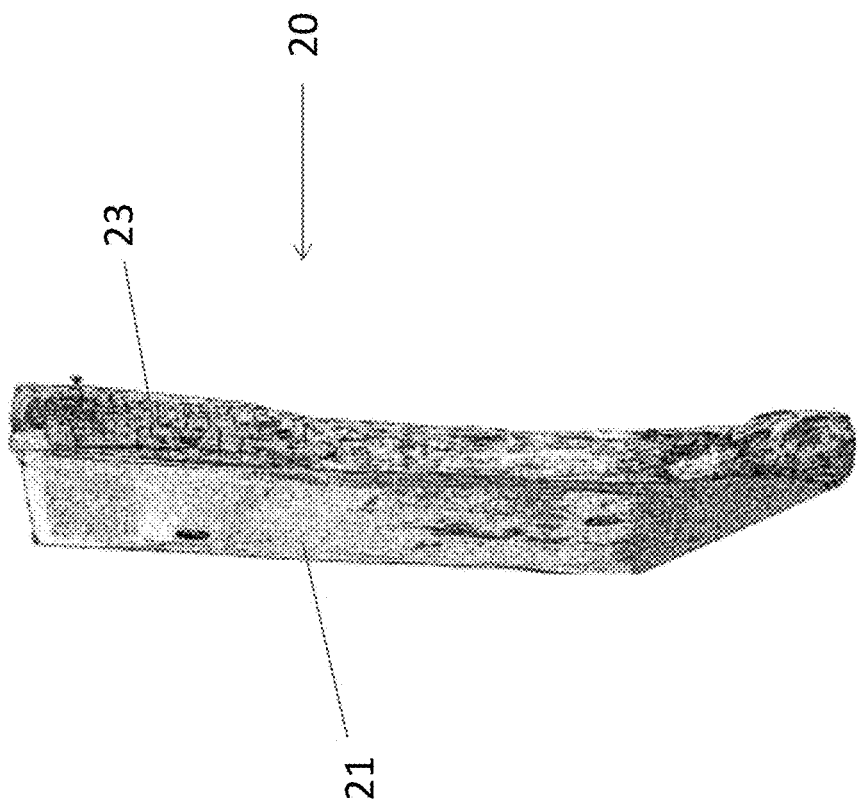
FIG. 7 is a raised side perspective of the back bottom cover.
Figure 8:
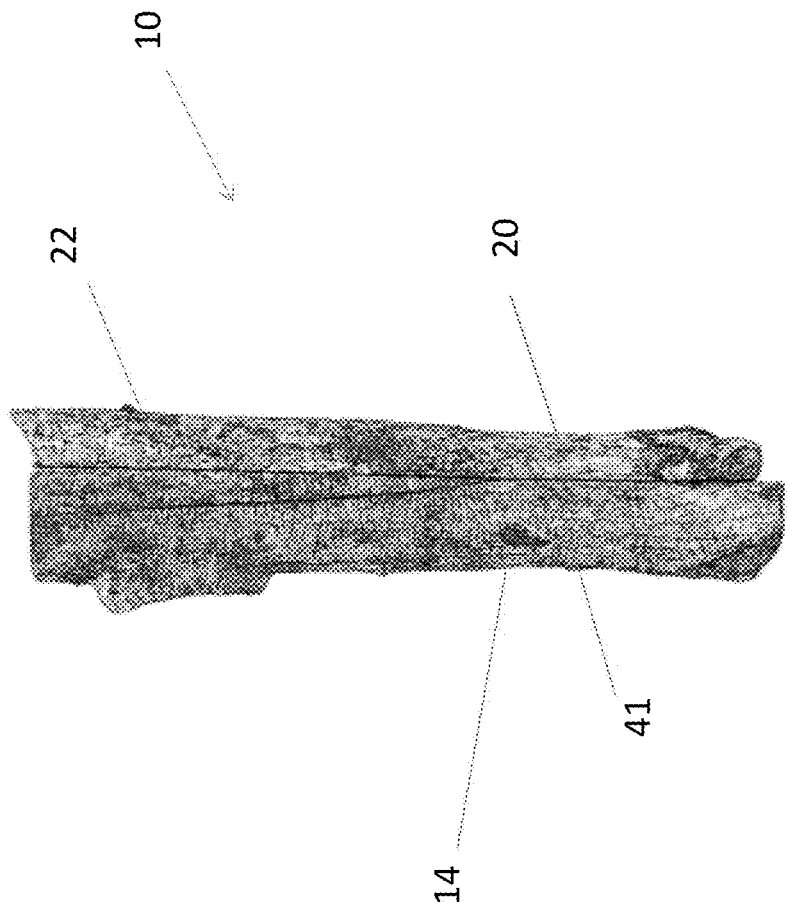
FIG. 8 is a side perspective of the front cover, the back top cover and the back bottom cover assembled.
Figure 9:
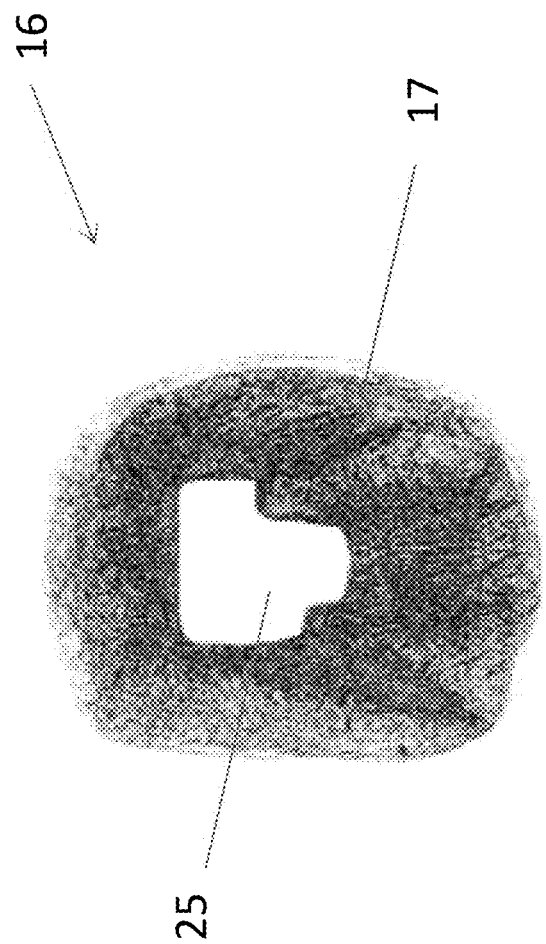
FIG. 9 is a front perspective of the insert.
Figure 10:
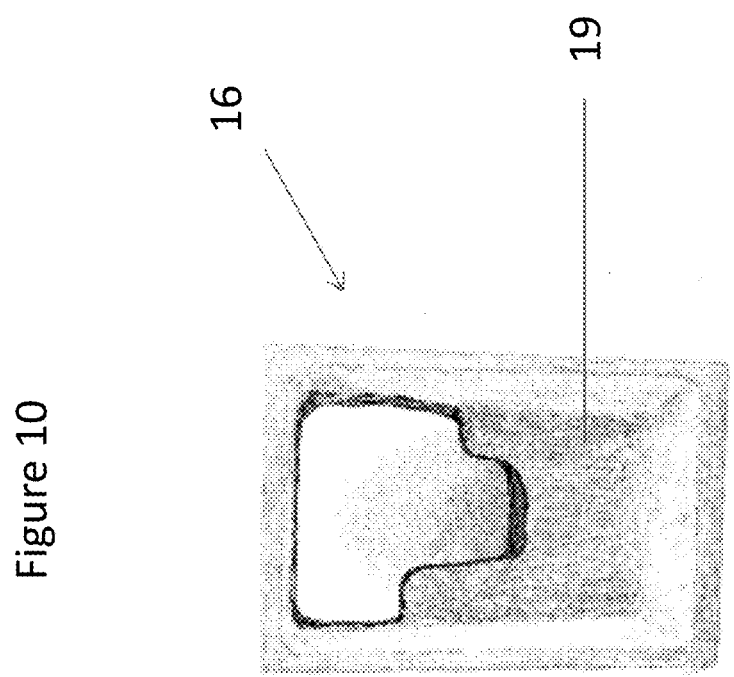
FIG. 10 is a back perspective of the insert.
Figure 11:
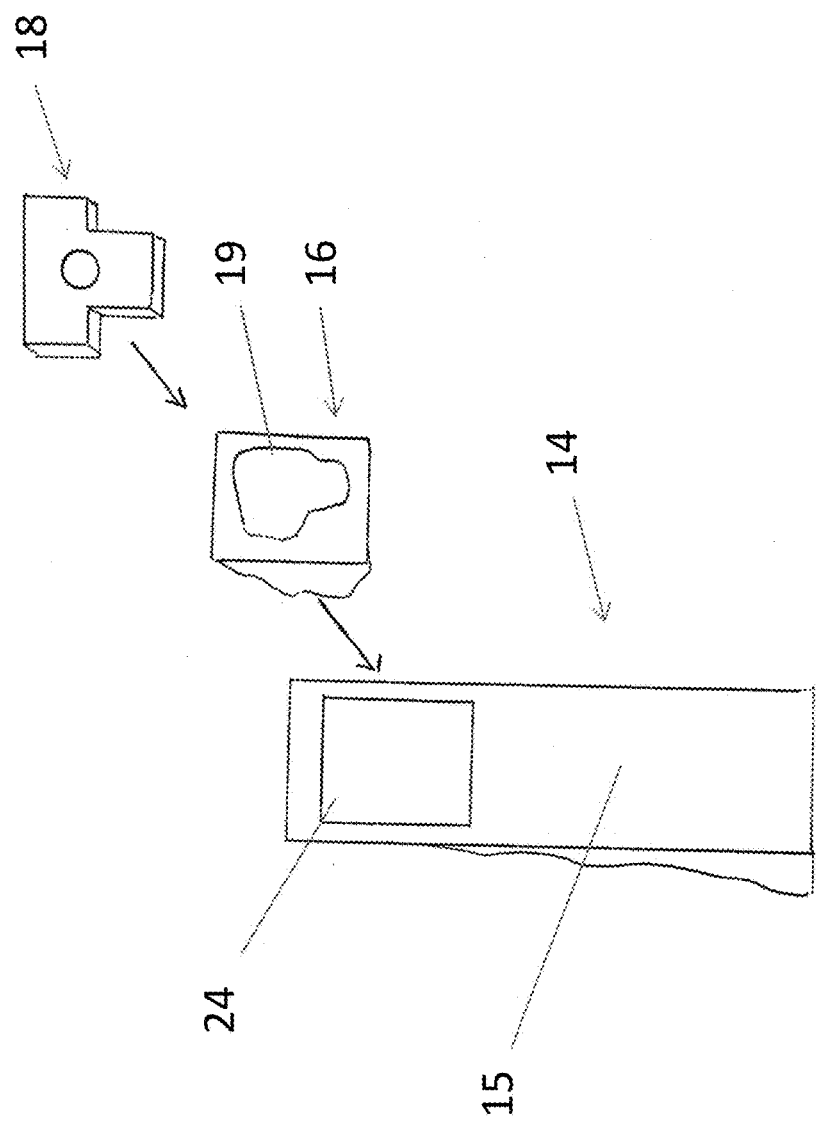
FIG. 11 is a back perspective of the camera, insert and front cover of the device, disassembled.
Figure 12:
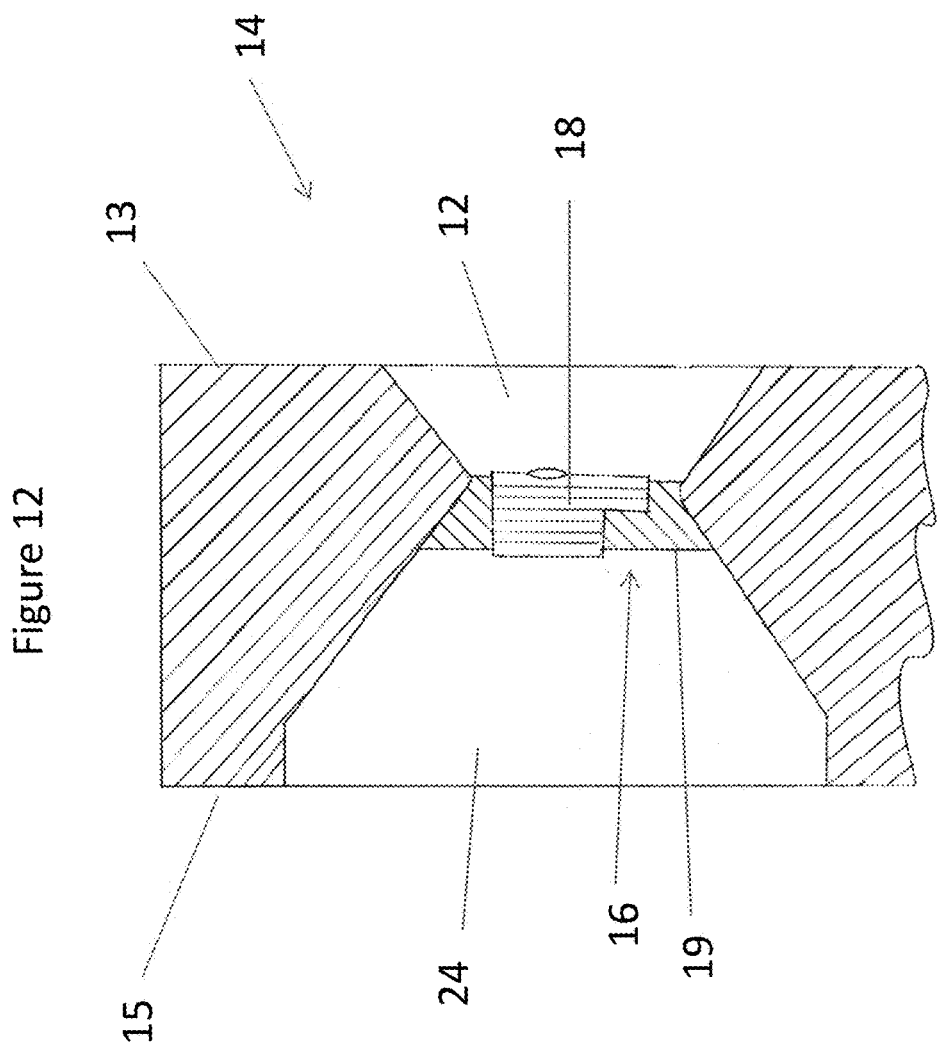
FIG. 12 is a partial side cut-away diagram of the front cover, the insert and the camera, assembled.
Figure 13:
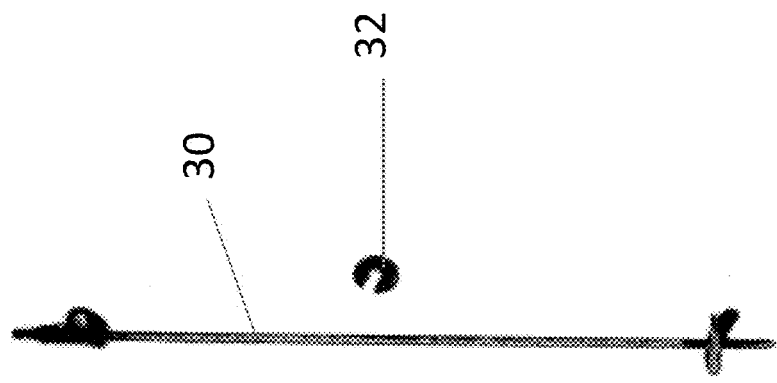
FIG. 13 is a side perspective of an auger stake and a split washer.
Figure 14:
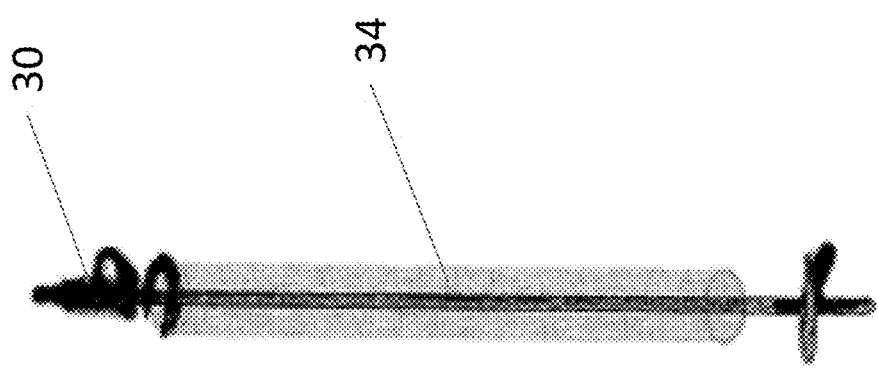
FIG. 14 is a side perspective of a pipe with the auger threaded through it.
Figure 15:
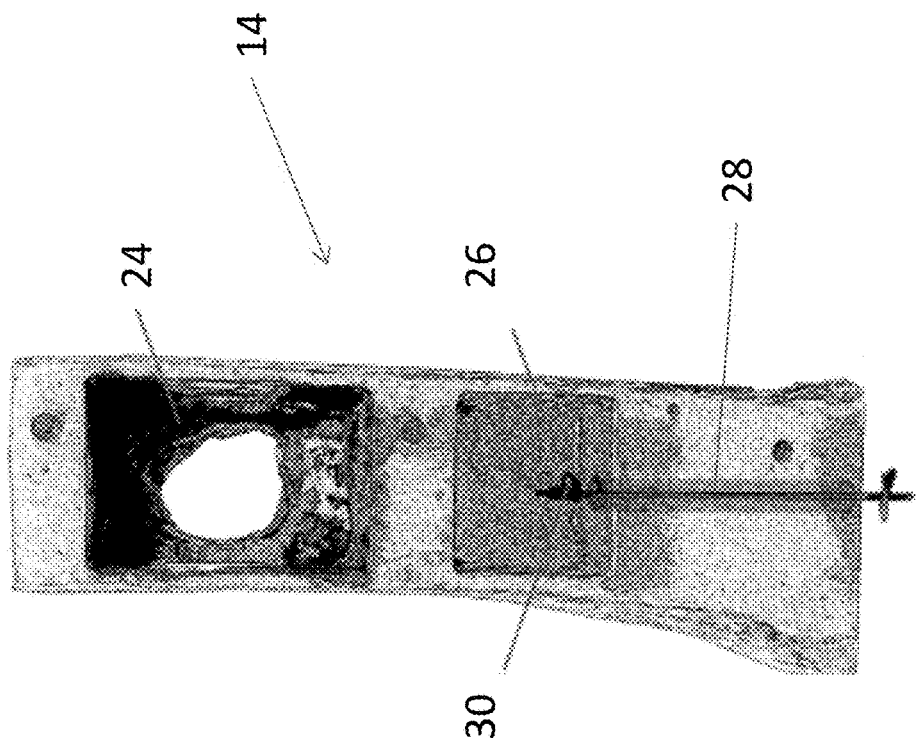
FIG. 15 is a back perspective of the front cover of the device showing the pipe and auger threaded through it, inserted into padlock compartment to secure the camera camouflage device.
Figure 16:
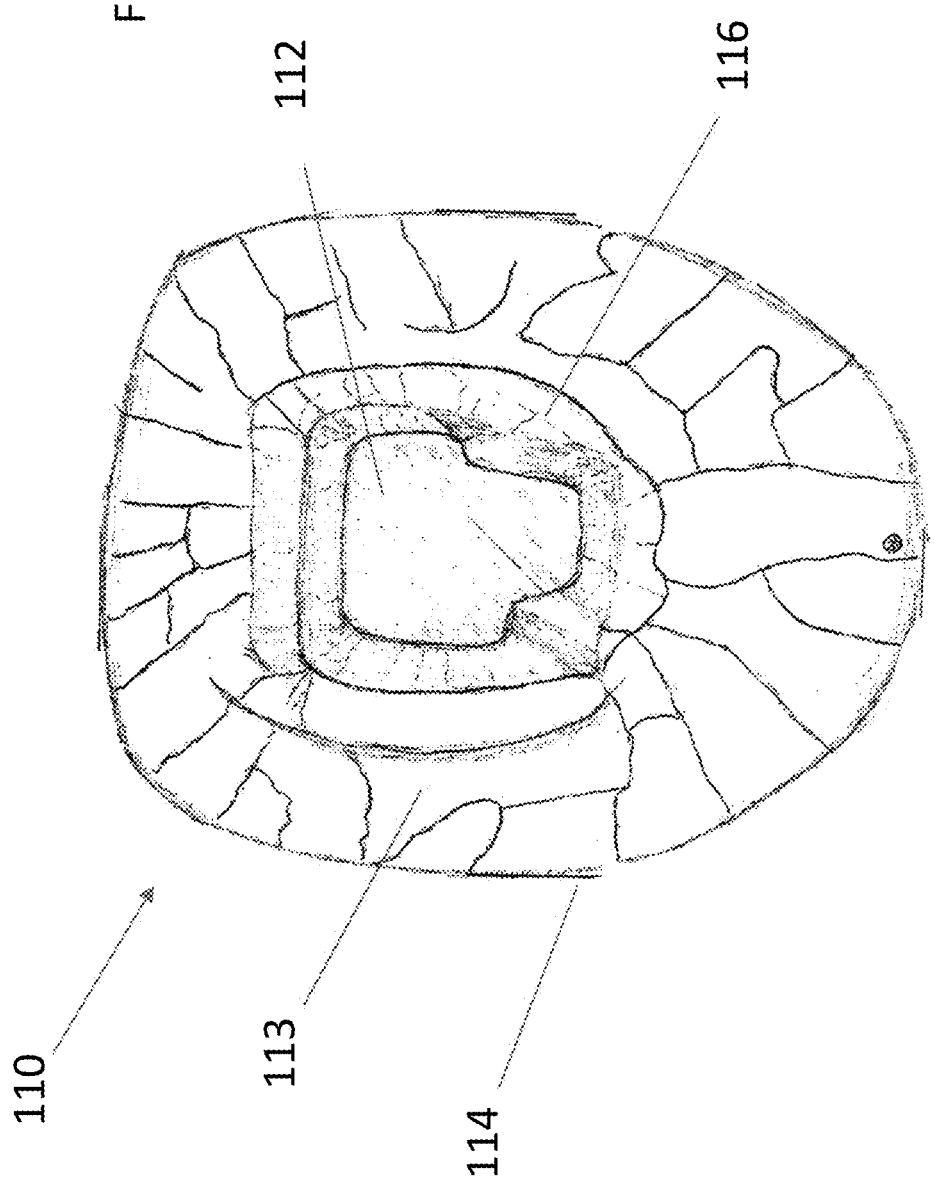
FIG. 16 is a front planar view of the knothole of the device with the knothole insert.
Figure 17:
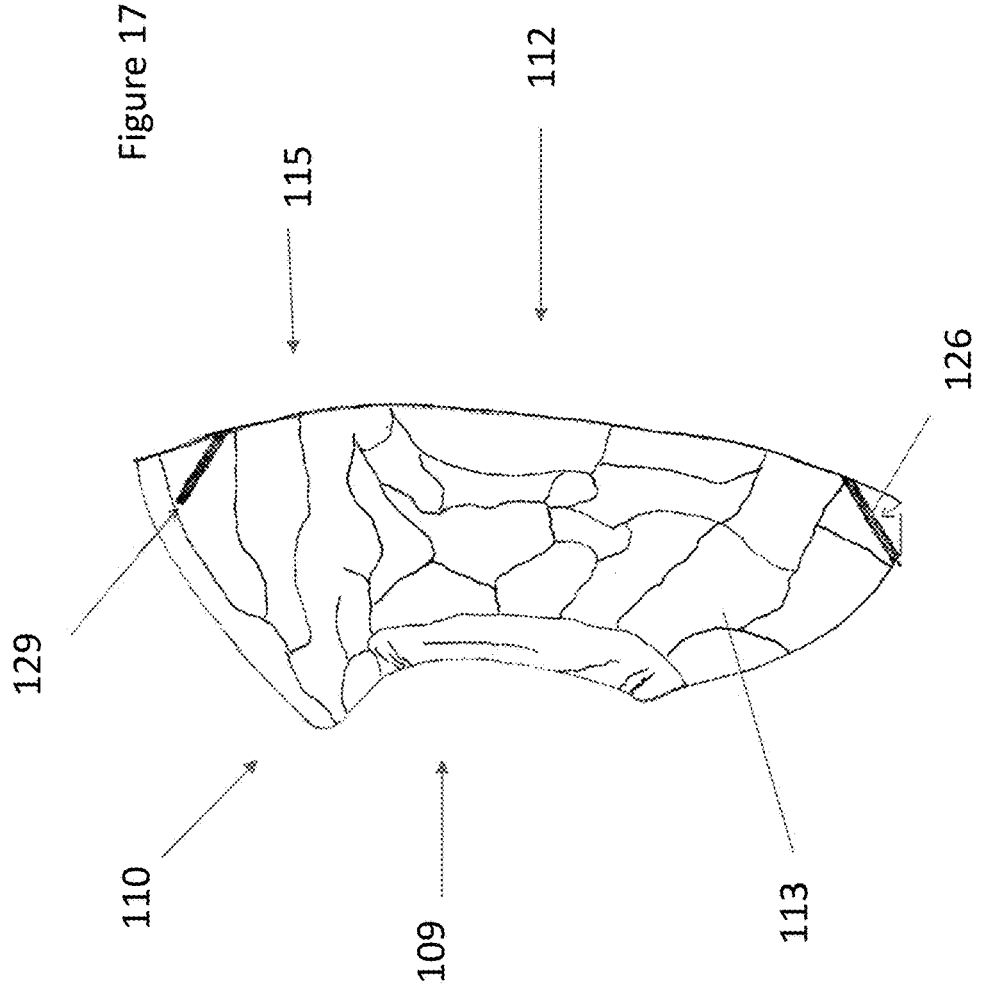
FIG. 17 is a side view of the knothole.
Figure 18:
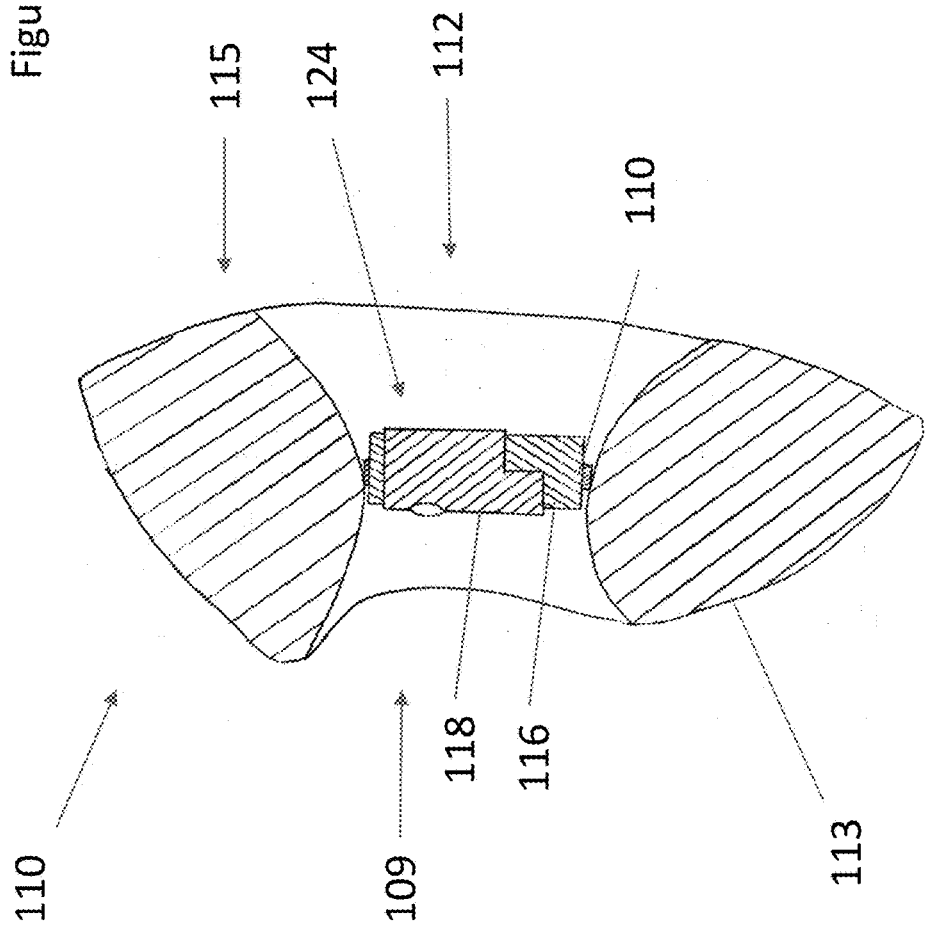
FIG. 18 is a cross section of the side view of the knothole of FIG. 17.
Figure 19:
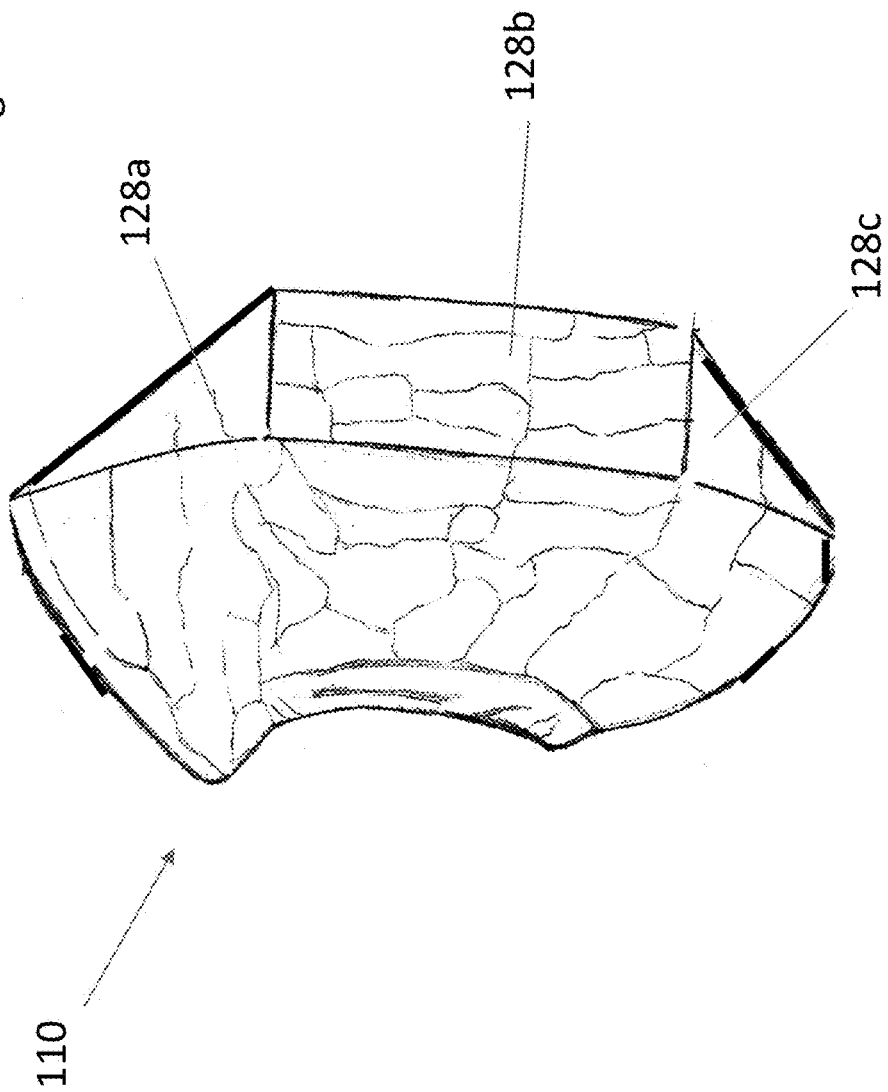
FIG. 19 is a side view of the knothole with extensions.
Figure 20:
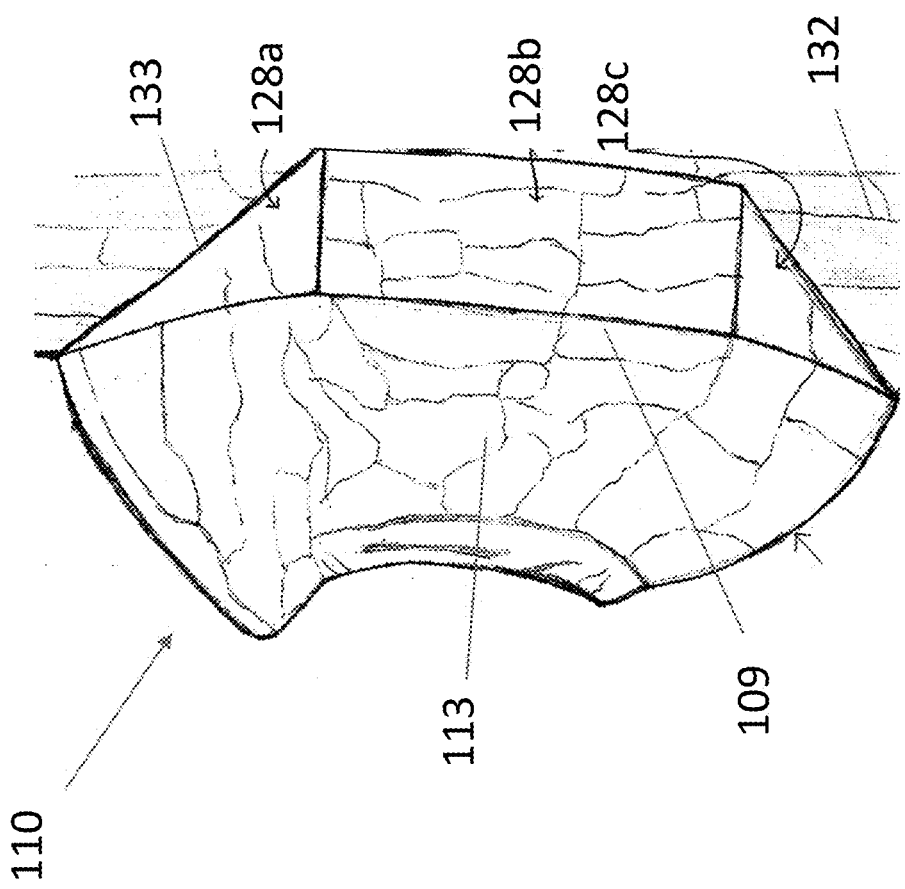
FIG. 20 is a side view of the knothole with extensions mounted on a tree trunk.

As shown in FIGS. 6 and 7, the back cover can be two or more covers, a back bottom cover 20 and a back top cover 22. In a preferred embodiment, the cover is one piece. Each back cover has an inner side 21 and an outer side 23. The outer side 23 has a camouflage surface 11. The inner side 21 removeably attaches to the back side 15 of the front cover to cover the camera compartment and the locking compartment. The outer side's camouflage surface matches the front side's camouflage surface.

As shown in FIGS. 1, 5a, 9, 10 11 and 12, the camera compartment is configured to removeably mount a camera. On the back side 15 of the front cover 14, a removeable insert 16 is placed that is designed to securely nest in the camera compartment 24. The insert is designed to engage with a camera 18 that has a lens which, when engaged with the insert 16, aligns with the opening 12. When the insert 16 is mounted in the camera compartment it has an insert opening 25 that communicates fluidly between the opening 12 and the camera compartment 24. The insert front 17 has a camouflage surface so that it matches the camouflage surface of the front side 13.

The insert 16 can be designed to engage with a certain model of camera 18. The present invention includes inserts 16 that are interchangeable to engage with different models of camera 18 that have different dimensions.

When the insert, the camera, the front cover and the back cover are removeably assembled, the camera is concealed. Screws or other well-known fasteners can be used to assemble the device. There are no discernable seams, as the insert, front cover and back cover are designed to fit together so that the exterior 41 of the device gives the appearance of a tree stump.

In a preferred embodiment, as shown in FIGS. 5a, 13, 14 and 15, the back of the front cover can have a locking compartment 26. In the locking compartment and descending to the bottom of the front cover can be an auger channel 28. Threaded through the auger channel 28 can be an auger 30 of sufficient length to descend several inches into the ground to secure the auger, and thereby the camouflage camera device 10. The auger channel can be created using a piece of pipe 34, for example PVC pipe. The auger can be locked in place using a padlock secured on the end of the auger, so that without unlocking the padlock, the camouflage camera device cannot be lifted up and removed from the auger anchored in the ground.

In a preferred embodiment the camouflage device is designed to have a stump-like appearance. In another embodiment, the device is designed to look like a rock. In another embodiment, the device is designed to look like a cactus. The term "free-standing" includes leaning against a tree, fence, rock or wall. It also includes hanging from a branch or fence.

In a preferred embodiment, the device is made from a stump or piece of tree trunk. In another embodiment, the device is made from polyurethane plastic, urethane foam, plywood and PVC pipe.

A second embodiment of the present invention, as shown in FIGS. 16 to 30, is a tree-mounted knothole device 110 is used to camouflage and to secure a camera to a tree trunk. The device 110 can be made of polyurethane plastic, urethane foam, plywood, tree bark, tree parts, or other materials. The device 110 has a knothole 114. As shown in FIGS. 1, 2 and 5, the knothole 114 has a perimeter 108, a front opening 109, a front side 113 and a back side 115. The front side 113 has a camouflage surface 111 and an opening 112. The back side 115 has a camera compartment 124 that fluidly connects with the opening 112.

Figure 26:
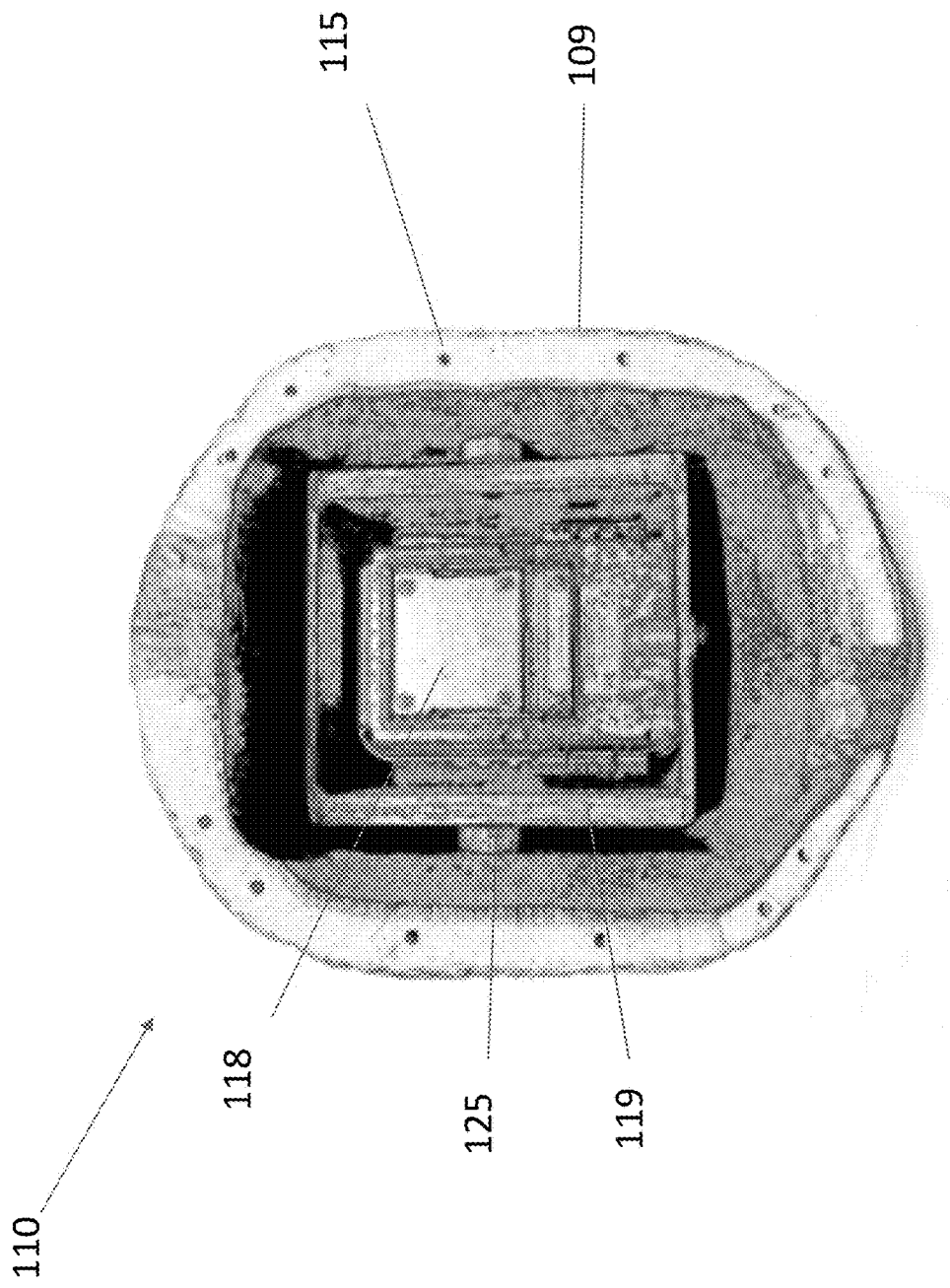
FIG. 26 is a back view of the knothole with insert, spacers and a camera.
Figure 27:
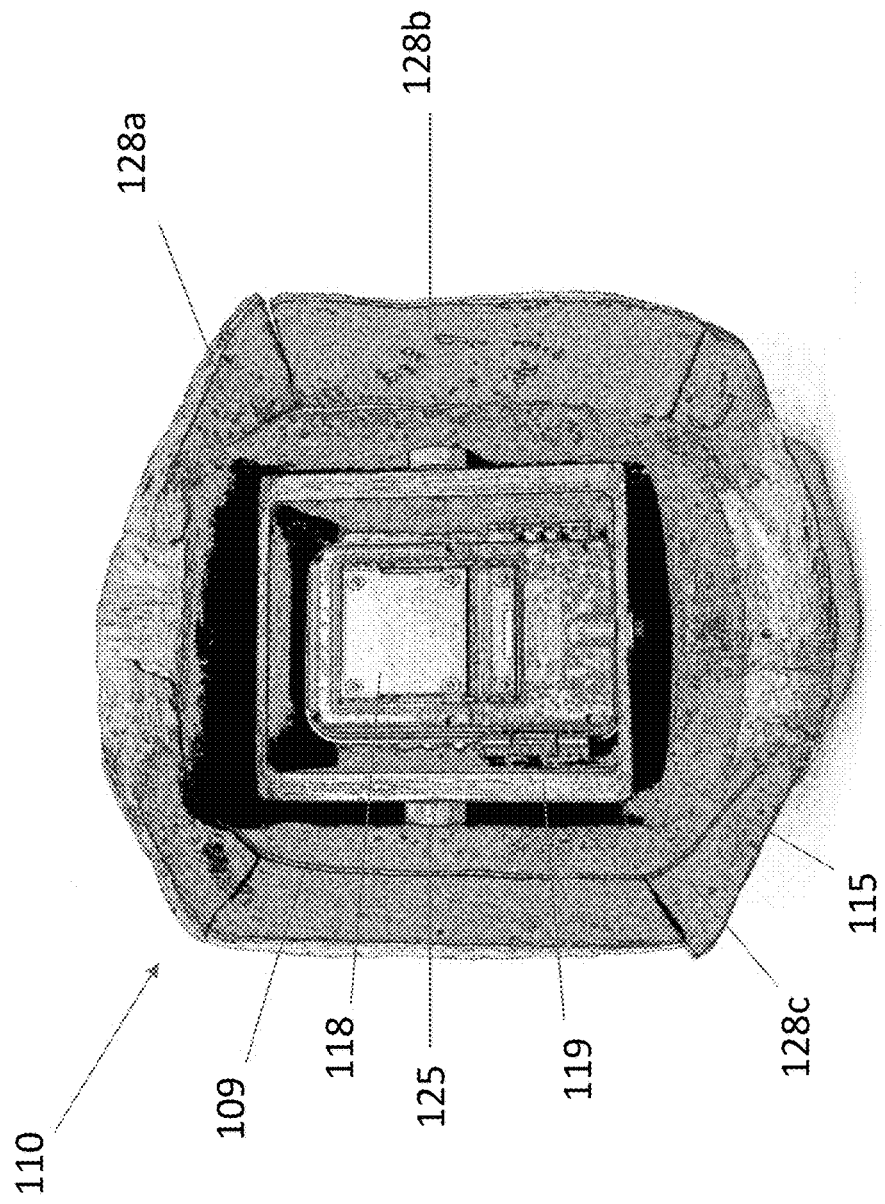
FIG. 27 is a back view of the knothole with insert, spacers, a camera and extensions.
Figure 28:
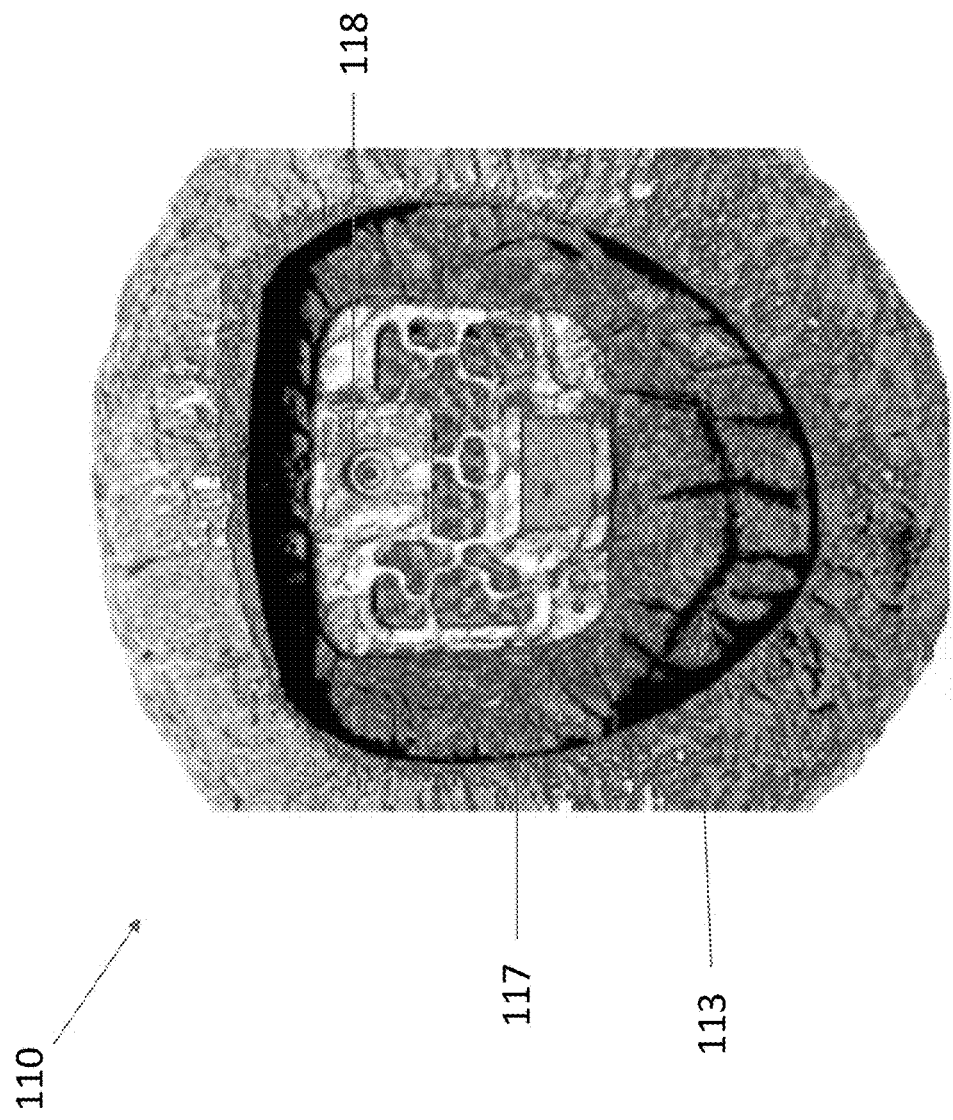
FIG. 28 is a front view of the knothole with insert and a camera.

As shown in FIGS. 18, 26, 27 and 28, the camera compartment is configured to removeably mount a camera. In a preferred embodiment, on the back side 115 of the knothole 114, a removeable insert 116 is placed that is designed to securely nest in the camera compartment 124. When the insert 116 is mounted in the camera compartment 124 it has an insert opening 120 that communicates fluidly between the opening 112 and the camera compartment 124. The insert is designed to engage with a camera 118 that has a lens which, when engaged with the insert 116, aligns with the opening 112. The insert front 117 has a camouflage surface so that it is consistent with the camouflage surface of the front side 113. As shown in FIGS. 26 and 27, mounting spacers 125 can be used to secure the insert 116 in the camera compartment 124. In a preferred embodiment, the mounting spacers 125 rotate in a way to allow the camera lens to be adjusted upward or downward to video the desired location.

Figure 23:
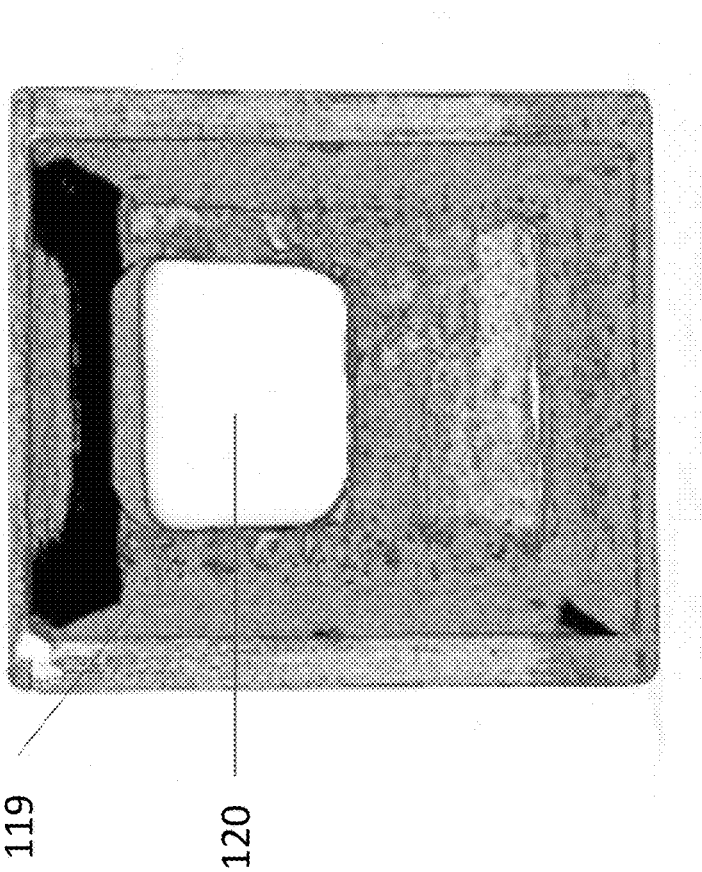
FIG. 23 is back view of the knothole insert.
Figure 24:
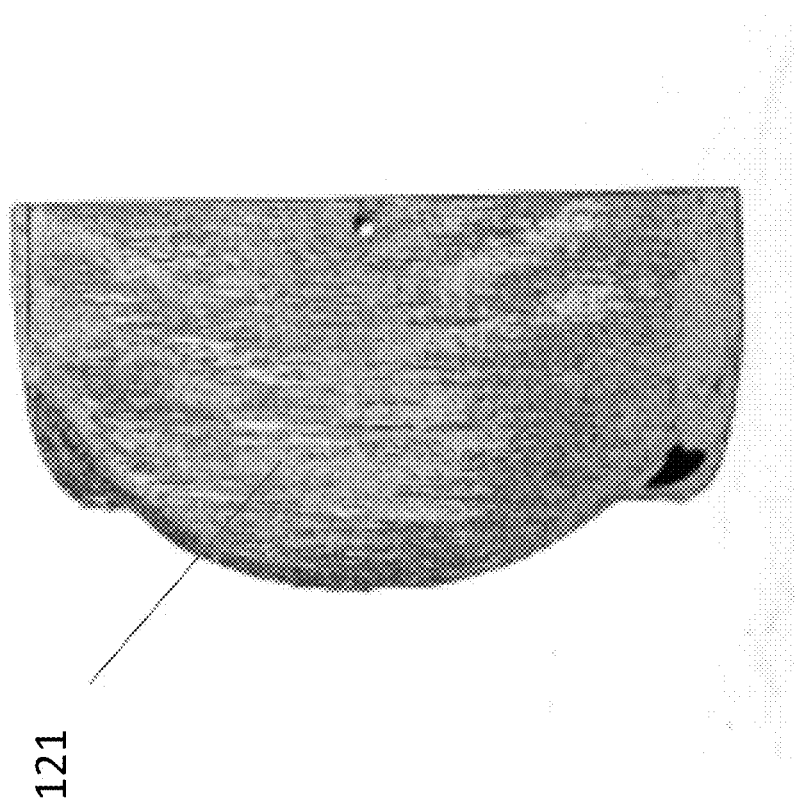
FIG. 24 is a side view of the knothole insert.
Figure 25:
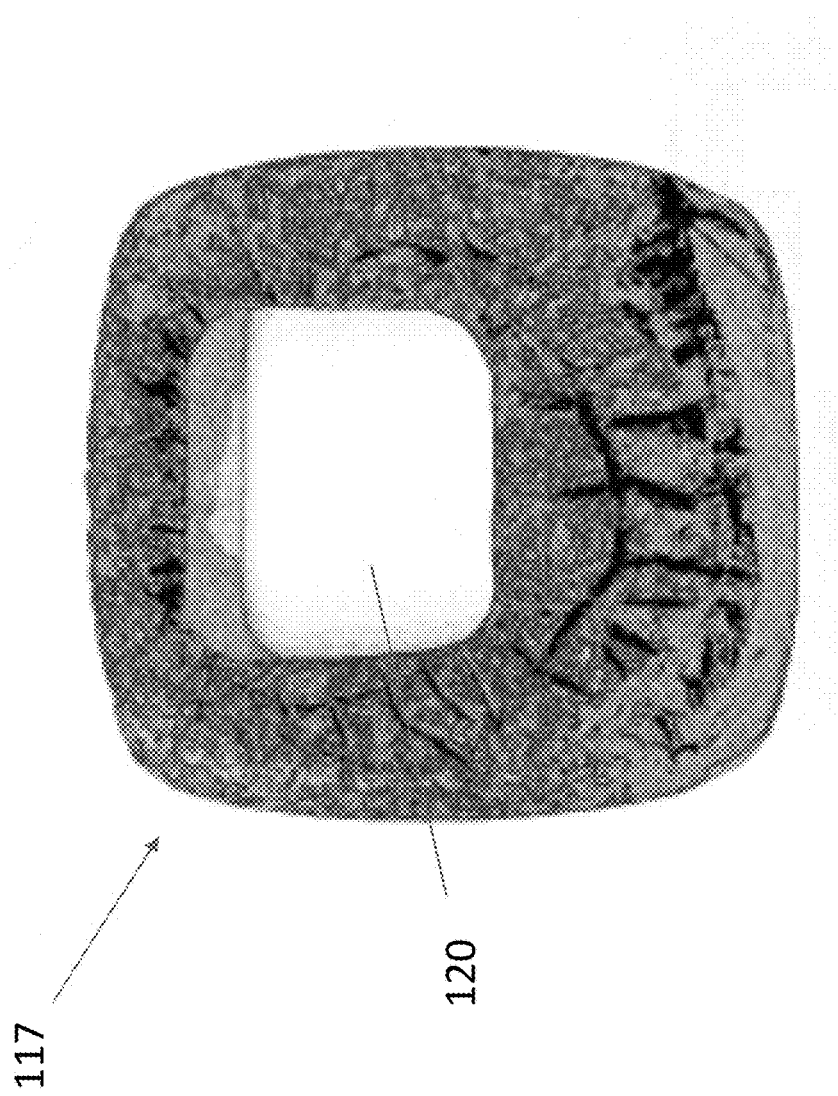
FIG. 25 is front view of the knothole insert

As shown in FIGS. 23, 24 and 25, the insert 116 has a back 119, a front 117, a side 121 and an opening 120. The insert 116 can be designed to engage with a certain model of camera 118. The present invention includes inserts 116 that are interchangeable to engage with different models of camera 118 that have different dimensions.

Figure 21:
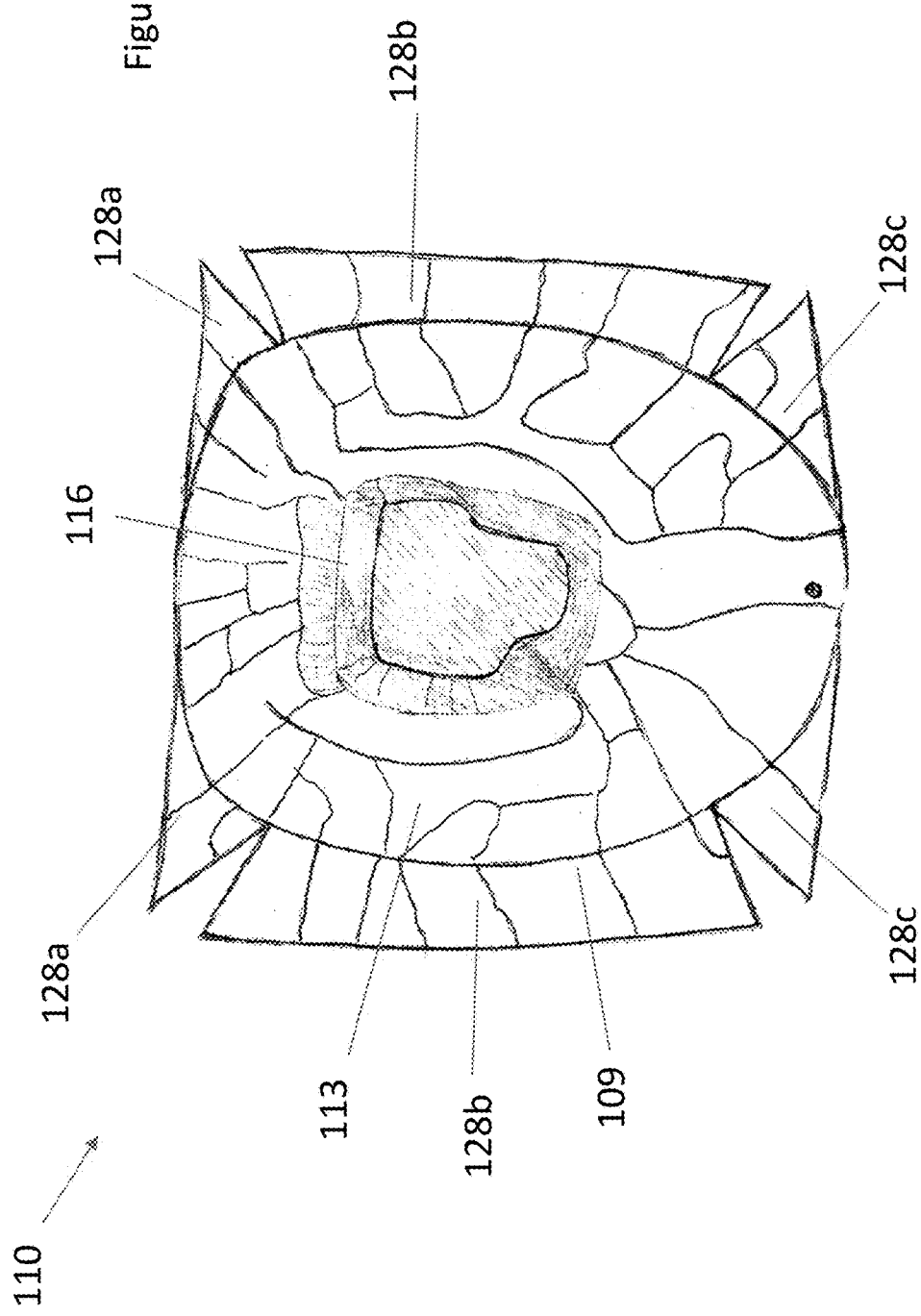
FIG. 21 is a front planar view of the knothole with extensions unassembled.
Figure 22B:
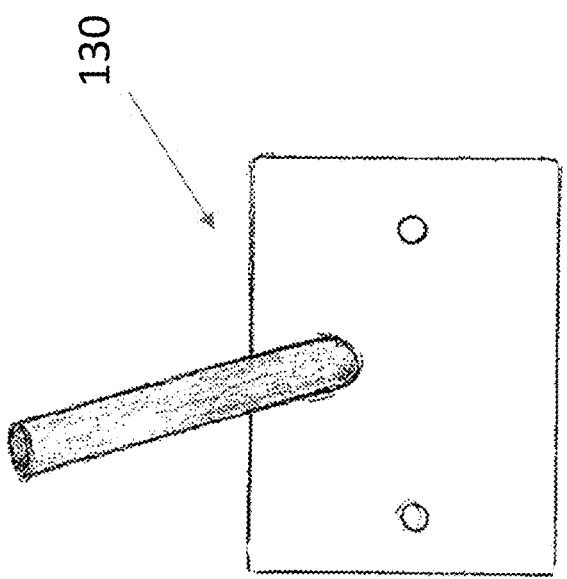
FIG. 22b is a front perspective view of the mounting device for the knothole.
Figure 22A:
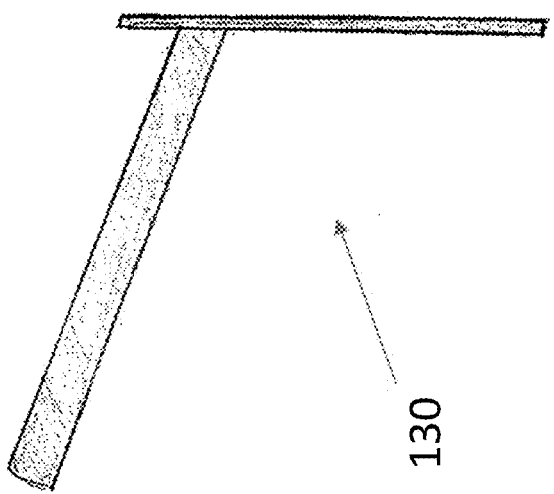
FIG. 22a is a side view of the mounting device for the knothole.
Figure 29:
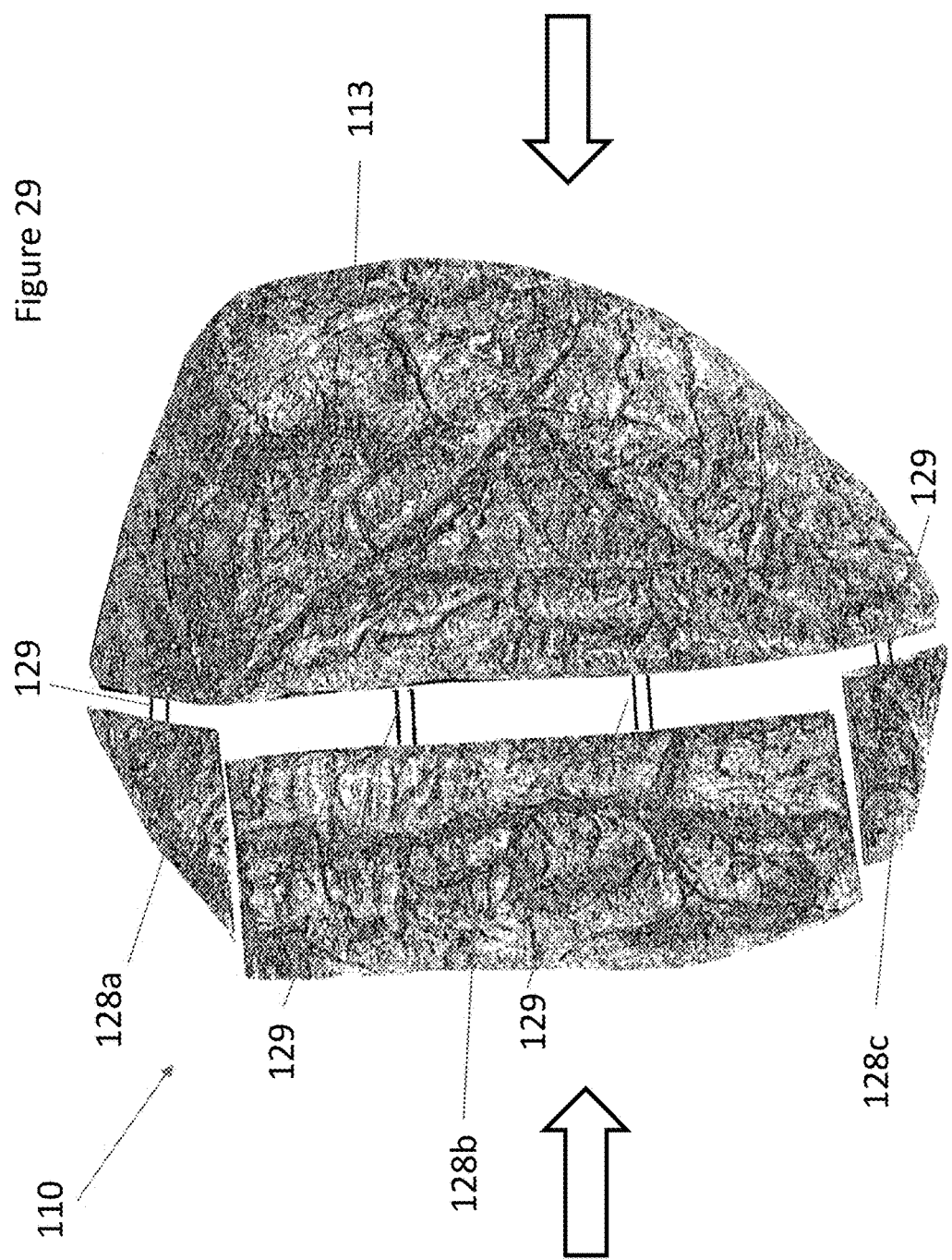
FIG. 29 is a side view of the knothole with extensions and extension rods, unassembled.
Figure 30:
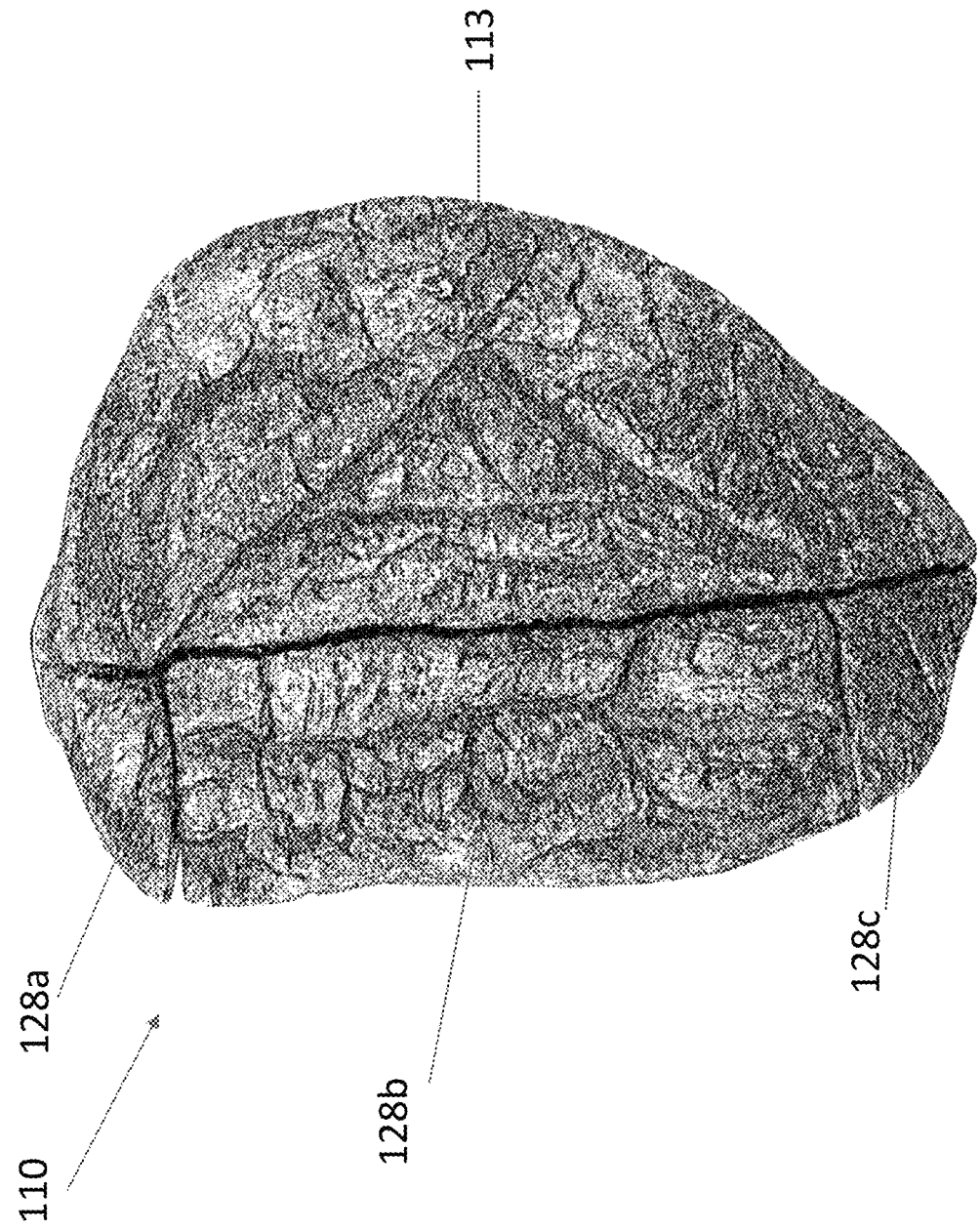
FIG. 30 is a side view of the knothole with extensions, assembled.

In a preferred embodiment, as shown in FIGS. 19, 20, 21, 27, 29 and 30, the knothole device 110 can include one or more side extensions 128. The extensions allow the knothole device 110 to be expanded and adjusted to fit different-sized trees. The extensions can be in six pieces that are generally symmetrically arranged. As shown in FIG. 21, there are two top extensions 128a, two side extensions 128b and two bottom extensions 128c. The two top extensions and two bottom extensions are approximately triangular, and the two side extensions are approximately rectangular. For FIG. 21, there is no insert, but rather the knothole device has a molded opening that accommodates only one type or shape of camera. The extensions can be connected to the knothole 114 with extension rods 129, as shown in FIG. 29. The extension rods 129 can be bent to conform to the curvature of the tree trunk 132. The extensions 128 are mounted on the front side of the knothole 113 around its perimeter 109. The extensions are assembled by pushing the knothole 114, the extensions and knothole together, as indicated by the arrows on FIG. 29. The assembled knot hole device 110 is such that all the pieces come together, like a puzzle, with the edges of the pieces, i.e., the knot hole 113 and the extensions 128a, 128b, 128c, touching, and the perimeter of the extensions 133 form a continuous cover that touches the tree trunk and is camouflaged to resemble the tree trunk. The assembled knothole, shown in FIG. 30, with extensions can be mounted on the tree trunk, and the camera is completely concealed.

The knothole 110 device is secured to the tree with a mounting device 130. The top of the device hangs on the mounting device 130, and a T25 torque screw mounting screw 126 secures the bottom of the device to the tree.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A free-standing camera camouflage device comprising a front cover and a back cover, wherein the front cover has a front side and a back side and an opening therethrough; wherein the front side has a camouflage surface and a front opening that fluidly connects with the opening therethrough; wherein the back side has a camera compartment that fluidly connects with the opening therethrough, and a camera compartment back opening that fluidly connects with the camera compartment; wherein the back cover has an inner side and an outer side; wherein the inner side removeably attaches to the back side of the front cover to cover the camera compartment; where the outer side has a camouflage surface that matches the front side camouflage; wherein the front side of the front cover and the outer side of the back cover define the exterior of the device; wherein the camera compartment consists of a camera mounted removeably therein; wherein when the camera, the front cover and the back cover are removeably assembled, the camera is concealed and there are no discernable seams so that the exterior device gives the appearance of a tree stump.

2. The free-standing camera camouflage device of claim 1, wherein the camera compartment consists of a removeable camera insert and the camera; wherein the removeable camera insert is designed to securely nest in the camera compartment; wherein the insert has an insert opening that, when mounted in the camera compartment, communicates fluidly between the opening therethrough and the camera compartment; wherein the camera is mounted in the insert opening which has be configured to securely hold the camera; wherein when the camera insert, the camera, the front cover and the back cover are removeably assembled, the camera is concealed.

3. The free-standing camera camouflage device of claim 1, wherein the back side has a locking compartment below the camera compartment; and wherein the locking compartment has an auger channel from the locking compartment to the bottom of the front cover.

4. The free-standing camera camouflage device of claim 2, wherein the back side has a locking compartment below the camera compartment; and wherein the locking compartment has an auger channel from the locking compartment to the bottom of the front cover.

5. A free-standing camera camouflage device comprising a front cover and a back cover, wherein the front cover has a front side and a back side and an opening therethrough; wherein the front side has a camouflage surface and a front opening that fluidly connects with the opening therethrough; wherein the back side has a camera compartment that fluidly connects with the opening therethrough and a camera compartment back opening that fluidly connects with the camera compartment; wherein the back cover has an inner side and an outer side; wherein the inner side removeably attaches to the back side of the front cover to cover the camera compartment and a locking compartment; wherein the outer side has a camouflage surface that matches the front side camouflage; wherein the front side of the front cover and the outer side of the back cover define the exterior of the device; wherein the camera compartment consists of a removeable camera insert and the camera; wherein the removeable camera insert securely nests in the camera compartment; wherein the insert has an insert opening that communicates fluidly between the opening therethrough and the camera compartment; wherein a camera is mounted in the insert opening which securely holds the camera; wherein when the camera insert, the camera, the front cover and the back cover are removeably assembled, the camera is concealed and faces out of the front opening to facilitate photographing and wherein there are no discernable seams so that the exterior device gives the appearance of a tree stump.

6. The free-standing camera camouflage device of claim 5, wherein the back side has a locking compartment below the camera compartment; and wherein the locking compartment has an auger channel from the locking compartment to the bottom of the front cover.

7. A tree-mountable camera camouflage device comprising a knothole, wherein the knothole has a perimeter, a front side, a back side and an opening therethrough; wherein the front side has a camouflage surface and a front opening; wherein the back side has a camera compartment that fluidly connects with the opening therethrough; wherein the camera compartment is configured to removeably mount a camera; wherein when the camera, and the knothole are removeably assembled, and the back side is mounted on a tree, the camera is concealed; and wherein six extensions are mounted on the knothole perimeter.

8. The tree-mounted camera camouflage device of claim 7, further comprising a removeable camera insert mounted in the camera compartment; wherein the camera insert has an insert opening that communicates fluidly between the front opening and the camera compartment; wherein the insert opening is configured to securely hold the camera; wherein when the camera insert, the camera and the knothole are assembled, the camera is concealed.

9. The tree-mounted camera camouflage device of claim 8, wherein six extensions are mounted on the knothole perimeter using extension rods.

10. The tree-mounted camera camouflage device of claim 8, wherein the camera insert is fixed in place in the camera chamber with at least one spacer.

11. The tree-mounted camera camouflage device of claim 9, wherein the camera insert is fixed in place in the camera chamber with at least one spacer.

12. The tree-mounted camera camouflage device of claim 10, wherein the tree-mounted camera camouflage device is mounted on a tree using a mounting device and a tree mounting screw.

13. The tree-mounted camera camouflage device of claim 11, wherein the tree-mounted camera camouflage device is mounted on a tree using a mounting device and a tree mounting screw.

14. The tree-mounted camera camouflage device of claim 7, wherein the camera is mounted in the camera compartment.

15. The tree-mounted camera camouflage device of claim 7, wherein six extensions are mounted on the knothole perimeter using extension rods.

16. The tree-mounted camera camouflage device of claim 7, wherein the knothole is made of polyurethane.

\* \* \* \* \*